United States Patent [19]

Boice

[11] 3,764,872

[45] Oct. 9, 1973

[54] STABILIZING MEANS FOR AN A-C MOTOR DRIVE

[75] Inventor: William Knight Boice, Erie, Pa.

[73] Assignee: General Electric Company, Erie, Pa.

[22] Filed: June 13, 1972

[21] Appl. No.: 262,269

[52] U.S. Cl. ................................. 318/227, 318/332
[51] Int. Cl. ............................................. H02p 5/16
[58] Field of Search.................... 318/332, 345, 227, 318/326

[56] References Cited
UNITED STATES PATENTS

| | | | |
|---|---|---|---|
| 3,671,835 | 6/1972 | McMenamy | 318/332 |
| 3,683,252 | 8/1972 | Maynard | 318/331 |
| 3,612,971 | 10/1971 | Blaschke | 318/227 |
| 3,546,551 | 12/1970 | Risberg | 318/227 |

*Primary Examiner*—Bernard A. Gilheany
*Assistant Examiner*—Thomas Langer
*Attorney*—Harold H. Green et al.

[57] ABSTRACT

An a-c adjustable speed motor drive system including an a-c motor and power conversion means for converting d-c electric power to adjustable frequency, adjustable voltage electric power for delivery to the motor is provided with stabilizing means for damping motor speed oscillations. The stabilizing means includes apparatus for generating a signal proportional to the component of actual motor current that is in phase with the motor voltage and feedback means responsive to the in-phase signal for generating a stabilizing signal proportional to and phase shifted with respect to oscillations in the in-phase signal related to motor speed oscillations. The stabilizing signal is supplied to and utilized by the control apparatus for the power conversion means to adjust either the output frequency or the output voltage of the power conversion means. The feedback means includes resistive and capacitive elements connected in series between the in-phase signal generating apparatus and the control apparatus.

6 Claims, 3 Drawing Figures

STABILIZING MEANS FOR AN A-C MOTOR DRIVE

BACKGROUND OF THE INVENTION

1. Field of the Invention

This invention relates to a-c adjustable speed motor drive systems and, more particularly, to the utilization of the real or in-phase component of motor current for drive system stabilization.

2. Description of the Prior Art

It is well known that a-c motors, such as induction motors, synchronous motors, and reluctance-synchronous motors, are often unstable when operated at a particular frequency or range of frequencies with a particular load inertia. This tendency of a-c motors to oscillate about a steady state speed is most pronounced when operating at relatively low frequencies. In one case, it has been found that a reluctance-synchronous motor which is substantially stable when operated at a frequency of 68 cycles/sec and a synchronous speed of 1,360 rpm exhibits motor speed oscillations of as much as 65 rpm at a hunting frequency of approximately 5 cycles/sec when operated at a frequency of 7.5 cycles/sec and a synchronous speed of 150 rpm. In other drive systems, instability has been frequently observed under light load conditions within a frequency range of 10 to 20 cycles/sec.

In the past, a-c motors have been used largely in constant speed drive systems in which the motor is supplied with a-c electric power of a fixed frequency, the motor being designed for stable operation at that fixed frequency. For various reasons, however, adjustable speed drive systems using a-c motors are gaining acceptance, the motor being supplied with adjustable frequency and adjustable voltage power from suitable power conversion equipment such as an inverter or a cyclo-converter. In an a-c adjustable speed motor drive system, the motor should be capable of operating throughout an extremely broad frequency range and under a wide range of load conditions. Difficulties have been encountered heretofore, however, in that the desired ranges of speed and load conditions often include operating conditions under which the a-c motor is basically unstable. It is therefore highly desirable that means be provided for ensuring stable operation of a-c motor drives throughout broad speed and load ranges. More specifically, it is desirable that effective stabilization means be provided for variable frequency a-c drive systems utilizing pulse width modulated inverters of the type disclosed and claimed by copending U.S. Pat. application Ser. No. 81,758, entitled "Adjustable Speed Polyphase A-C Motor Drive," filed on Oct. 19, 1970, in the names of Carlton E. Graf and Werner K. Volkmann, assigned to the assignee of this invention. While the present invention will be described herein in connection with a drive system of the type taught by the aforesaid patent application to the extent necessary for a full and complete understanding of the invention, a more complete understanding of such inverter circuits may be obtained from the aforesaid patent application.

SUMMARY OF THE INVENTION

Accordingly, it is a primary object of this invention to provide improved means for stabilizing operation of a-c motors utilized in a-c adjustable speed motor drive systems.

Another object is to provide improved means for permitting stable operation of a-c motor drives throughout a broad range of speed and load conditions.

Yet another object of this invention is to provide improved means for stabilizing inverter drive systems of the type disclosed by the aforesaid patent application Ser. No. 81,758.

A still further object of the invention is to provide stabilization for a-c adjustable speed drive systems in a relatively simple and economical manner not requiring major modifications in the power conversion equipment and its control apparatus.

Briefly stated, in carrying out the invention in one form, stabilizing means for damping motor speed oscillations about a steady state motor speed are provided for an a-c adjustable speed motor drive system which includes power conversion means for changing d-c electric power to adjustable frequency, adjustable voltage a-c electric power, an a-c motor coupled to the power conversion means for receiving electric power therefrom, and control apparatus including frequency and voltage control means for controlling the frequency and voltage of the a-c power supplied to the motor. The stabilizing means of the invention includes means for generating an in-phase signal proportional to the output current of the power conversion means which is in phase with the output voltage and feedback means responsive to the in-phase signal for generating a stabilizing signal proportional to and phase shifted with respect to the in-phase signal. The feedback means is coupled to a selected one of the frequency control means and the voltage control means for supplying the stabilizing signal thereto as an input signal. When the feedback means is coupled to the voltage control means, it has a gain such that an increase in the in-phase signal results in an increase in the output voltage of the power conversion means. When the feedback means is coupled to the frequency control means, it has a gain such that an increase in the in-phase signal results in a decrease in the fundamental output frequency of the power conversion means. By a further aspect of the invention, the feedback means is comprised of capacitive and resistive elements connected in series between the inphase signal generating means and the frequency or voltage control means. By a still further aspect of the invention, the stabilizing feedback means is attenuated in its operation when the motor is operating at a substantially steady speed, and the stabilizing feedback means is operated in conjunction with IR compensation means responsive to the in-phase signal during motor operation at a substantially constant speed.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
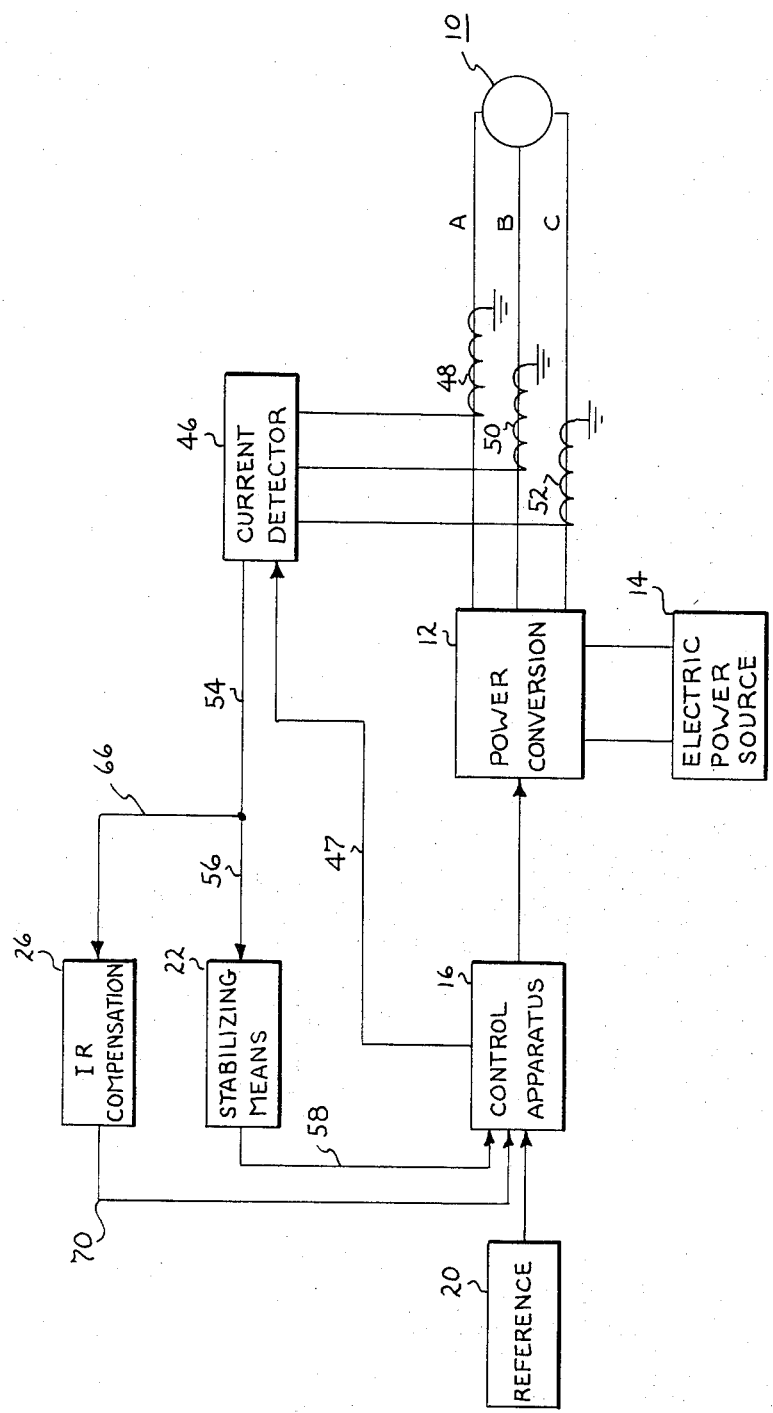
FIG. 1 is a block diagram of an a-c drive system including the stabilizing means of this invention.

Referring first to FIG. 1, an a-c motor drive system of the type disclosed by the aforesaid patent application Ser. No. 81,758 is illustrated in block diagram form. More particularly, the drive system as illustrated includes a three phase a-c reluctance-synchronous motor 10 supplied with variable frequency, variable voltage electric power from power conversion apparatus 12 over phase conductors A, B and C. The power conversion apparatus 12 comprises inverter circuitry of the pulse width modulated type for transforming direct current electric power from a d-c source 14 to polyphase variable frequency, variable voltage a-c electric power. As taught by the aforesaid patent application, the inverter circuitry of the power conversion equipment 12 includes gate controlled rectifying devices such as silicon controlled rectifiers (SCR's) or gaseous thyratrons which conduct in a predetermined sequence and for time periods determined by gate firing pulses supplied to the controlled rectifiers from a control apparatus 16. A clear understanding of the basic principles of operation of the inverter circuitry and its control apparatus 16 may be obtained from the aforesaid patent application.

Still referring to the illustrated a-c drive system of FIG. 1, the control apparatus 16 produces firing pulses in the prescribed sequence at a rate determined by the magnitude and polarity of various input signals which include a reference signal from a source 20 indicating a desired motor speed and, in accordance with the present invention, a stabilizing signal generated by stabilizing means 22 when the speed of the motor 10 is oscillating about the speed called for by the reference signal. In practice, the control apparatus 16 is also supplied with one or more feedback signals such as an IR compensation signal supplied from an IR compensation network 26. The basic function of the control apparatus 16 is to produce, in response to the reference signal from the source 20, the stabilizing signal produced in accordance with this invention, and the other input signals, firing signals for delivery to the SCR's of the pulse width modulated inverter 12 at fundamental and chopping rates to control the frequency and voltage of the output power from the inverter 12 such that the motor 10 operates at the steady state speed called for by the reference signal.

Figure 2:
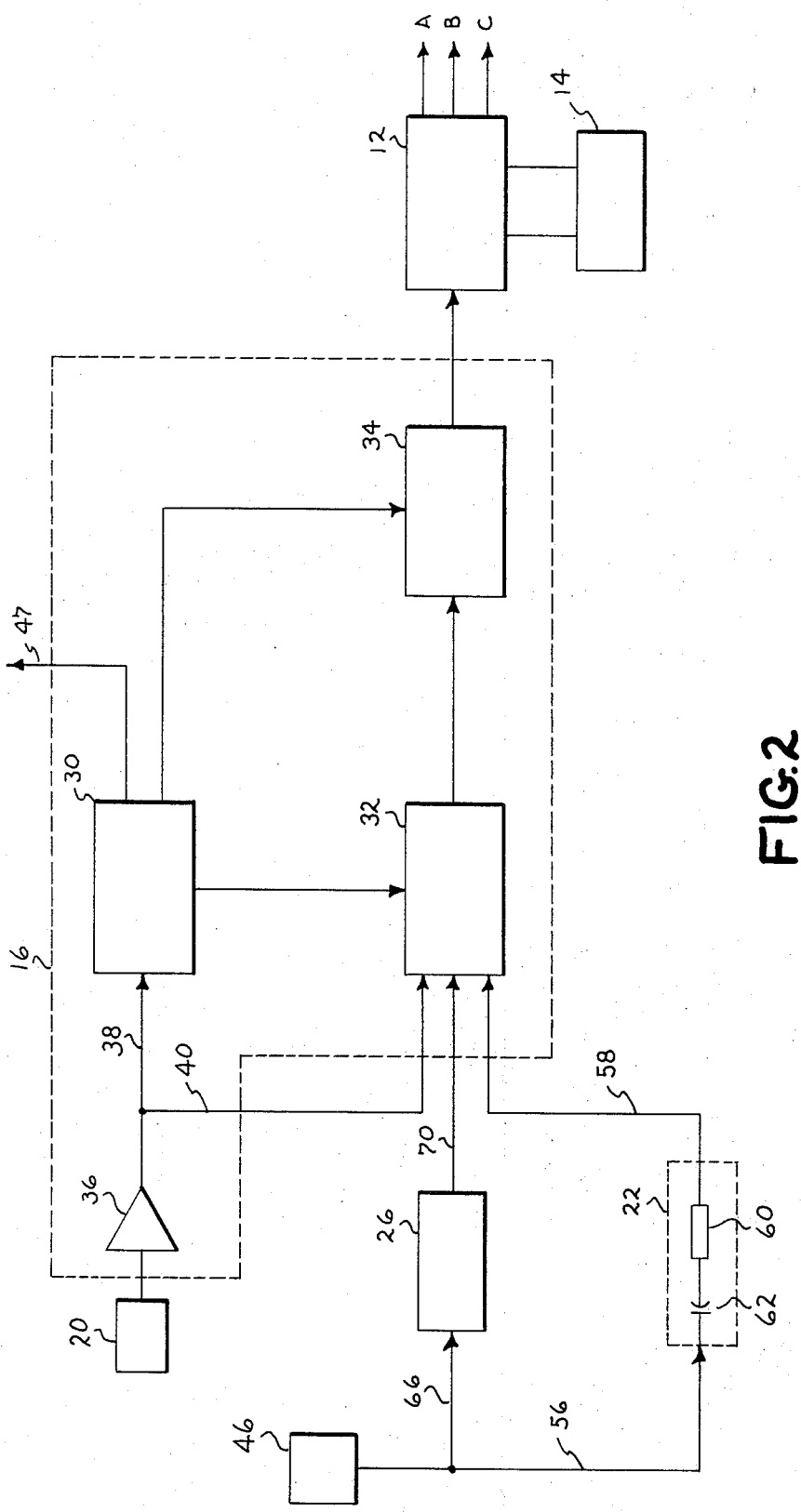
FIG. 2 is a more detailed diagram of a portion of the a-c drive system of FIG. 1 in which the stabilizing means is shown connected to the voltage control apparatus.
Figure 3:
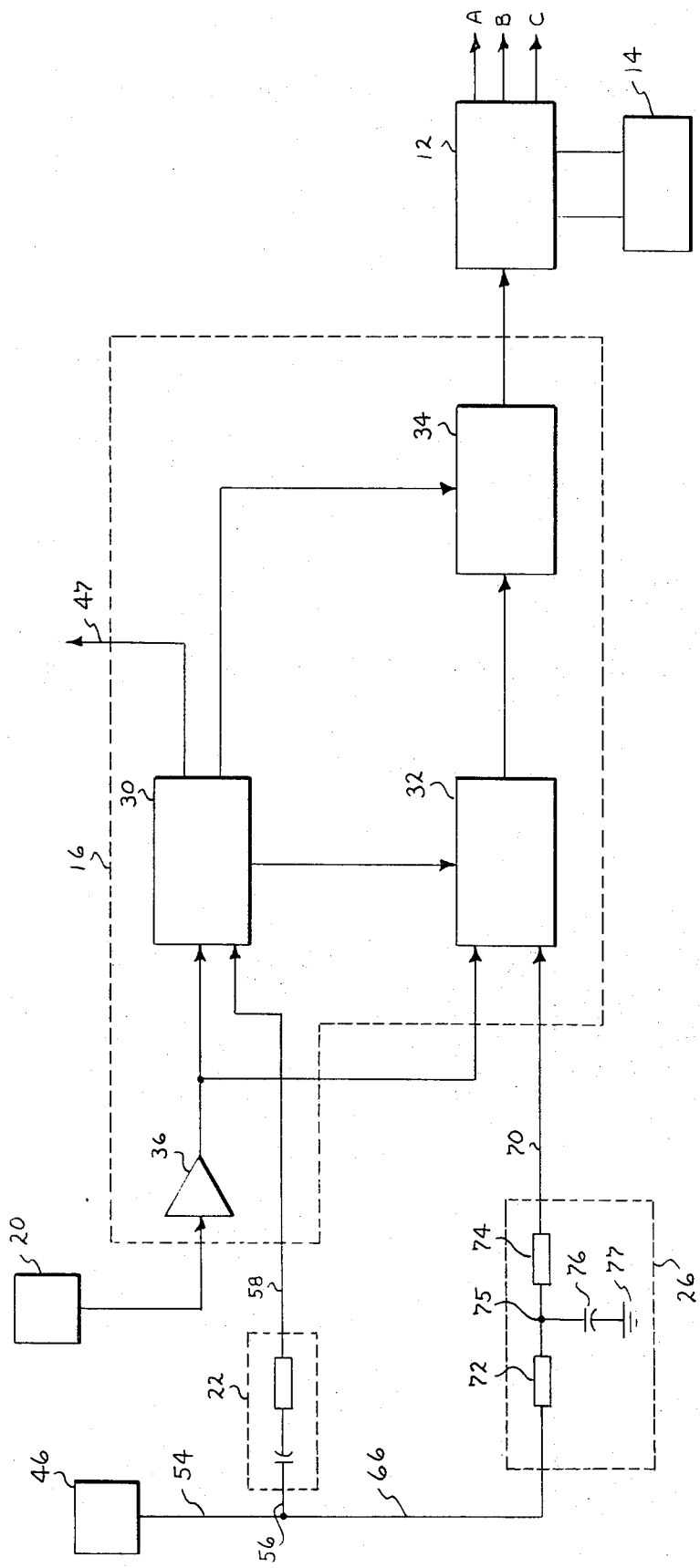
FIG. 3 is a view similar to FIG. 2 in which the stabilizing means is shown connected to the frequency control apparatus.

Before turning attention to the stabilizing means of the present invention, the control apparatus 16 will be considered in greater detail with references to the schematic diagrams of FIGS. 2 and 3. The control apparatus 16 responds to the command signal from the source 20, the stabilizing signal from the stabilizing means 22, and other input signals to determine the fundamental frequency of the alternating current electric power which is applied to the motor 10, the time-ratio-controlled switching or chopping frequency, and the ratio of the "on" and "off" times for time-ratio-controlled regulation of the output voltage level. The output frequency and the chopping frequency of the inverter are determined by a frequency generator 30. A time-ratio-control regulating circuit 32 determines the output voltage level of the inverter circuit by determining the relative on and off times of the load-current carrying controlled rectifiers. A firing control circuit 34 responds to both the frequency generator 30 and to the TRC regulating circuit 32 to fire the SCR's of the inverter circuit 12 in accordance with the outputs of the frequency generator 30 and the regulating circuit 32.

The command signal can be obtained from any source 20 which is convenient for indicating a desired speed for the motor 10 and is coupled through a command amplifier 36 to conductors 38 and 40 which lead to the frequency generator 30 and the TRC regulating circuit 32, respectively. The output of the command amplifier 36 may be affected not only by the command signal, but also by various other signals.

The general mode of operation of the control apparatus 16 and its component portions 30, 32, 34 and 36 will be described hereinafter to the extent necessary for a clear and complete understanding of the present invention. If for any reason a more detailed description of the component portions and their modes of operation is desired, the aforesaid patent application Ser. No. 81,758 provides such a description.

In a-c adjustable speed drive systems of the general type illustrated by FIG. 1, motor speed oscillations about the speed called for by the command signal from the reference source 20 are readily apparent from a number of the electrical parameters of the system. For example, the hunting frequency is apparent from voltage and current variations in the d-c link between the d-c source 14 and the power conversion means 12. It has heretofore occurred to those skilled in the art that it might be feasible to sense some quantity which varies in response to variations in motor speed and to use this quantity in a feedback circuit as a stabilizing signal. The present invention resides in the recognition that the real or in-phase component of the a-c current supplied to the motor is a particularly sensitive indicator of motor instability and in the provision of means for sensing and utilizing the real component to adjust the power output of the power conversion means such that positive damping is accomplished.

As illustrated by FIG. 1, the present invention utilizes an in-phase current detector 46 for generating an in-phase output signal proportional to the current output from the power conversion means 12 to the motor 10 over phase conductors A, B and C that is in phase with the output voltage. For a fuller understanding of a preferred embodiment of the in-phase current detector 46 for the polyphase drive system illustrated by FIG. 1, attention is directed to copending patent application Ser. No. 147,771 for "Adjustable Speed Polyphase A-C Motor Drive Utilizing An In-Phase Current Signal For Motor Control," filed on May 28, 1971, in the names of Carlton E. Graf, Einar A. Skogsholm, and Werner K. Volkmann, and assigned to the assignee of this invention. As fully explained therein, the in-phase current detector 46 is supplied on conductor 47 from the control apparatus 16 with signals in phase with the motor phase voltages and from current transformers 48, 50 and 52 with signals proportional to and in phase with the actual phase currents. The in-phase current detector 46 responds to these input signals to produce a composite output signal on conductor 54 which is proportional to the sum of the in-phase current components. It is particularly desirable in a-c drive systems to sense the in-phase components of current since the in-phase components have one polarity during the motoring mode of operation and the opposite polarity during the regenerative mode of operation. In a three phase system such as that illustrated herein, the in-phase signal on conductor 54 will be essentially a fixed level d-c signal when the motor 10 is operating at a constant speed without hunting, the signal having a relatively slight ripple content at a frequency several times greater than the fundamental output frequency of the inverter 12. If desired, an appropriate filter network can be provided to smooth out the higher frequency ripple. In the case of a single phase drive system, the ripple content will be substantially more pronounced, and appropriate filtering apparatus will be highly desirable to smooth out the ripple such that the in-phase signal will have a substantially fixed d-c level when the motor 10 is operating stably at a constant speed. While the current detector 46 may include filtering apparatus for smoothing out the ripple content at frequencies equal to or greater than the fundamental frequency of the electric power supplied to the motor 10, the filtering apparatus should be chosen such that oscillations in the in-phase signal occurring at frequencies lower than that of the fundamental frequency are not blocked out.

The in-phase signal produced by the current detector 46 and supplied therefrom to conductor 54 varies in accordance with variations in the speed of the motor 10, and the current detector 46 has a response rate such that motor speed oscillations about the speed called for by the command signal are detected and indicated by corresponding oscillations in the in-phase signal. These hunting oscillations occur at frequencies substantially lower than that of the fundamental frequency and are thus passed by any filtering apparatus associated with the current detector 46.

In accordance with the present invention, the in-phase signal on conductor 54 is supplied to stabilizing means 22 over conductor 56, the feedback stabilizing circuit 22 operating on the in-phase signal to produce a stabilizing signal in response to oscillations in the in-phase signal resulting from corresponding motor speed oscillations. More particularly, the stabilizing means 22 is a feedback circuit which responds to the variations in the in-phase signal by producing and supplying to conductor 58 a stabilizing signal having oscillations therein proportional to oscillations in the in-phase signal, but phase shifted relative to the oscillations in the in-phase signal. As illustrated by FIGS. 2 and 3, the feedback circuit 22 is a lead network comprising resistance 60 and capacitance 62 connected in series between the input conductor 56 and the output conductor 58, the values of the resistance 60 and the capacitance 62 being selected so as to set the gain and amount of phase shift required for maximum stability of the drive system. When the motor 10 is operating at a constant speed, the in-phase signal supplied to the feedback network 22 is a constant level d-c signal; under these conditions, the capacitor 62 blocks and no stabilizing signal is supplied to conductor 58. As taught by the aforesaid U.S. Pat. application Ser. No. 147,771, the in-phase signal on conductor 54 may also be used for other control functions including, but not limited to, IR compensation. As illustrated by FIGS. 1-3, the in-phase signal is also supplied over conductor 66 to an IR compensation circuit 26 which is effective during steady state operation of the drive system to provide IR compensation by providing a signal proportional to the in-phase signal on conductors 54 and 66 over conductor 70 to the voltage regulator 32 of the control apparatus 16. If desired, attenuating means may be provided for oscillations in the in-phase signal due to motor speed instability. This can be accomplished by providing suitable filter apparatus for filtering out low frequency hunting oscillations. As illustrated by FIG. 3, this can be readily accomplished by means of resistors 72 and 74 in series between conductors 66 and 70 and a capacitor 76 interconnecting the junction 75 and common 77. Other attenuating arrangements will also occur to those skilled in the art.

In accordance with the invention, the stabilizing signal generated by the stabilizing network 22 is supplied to the control apparatus 16 as a control signal. As illustrated by FIG. 2, the conductor 58 may be connected to the voltage control or TRC regulating circuit 32 for adjusting the output voltage of the inverter 12 in response to variations in the stabilizing signal. In such a case, the gain of the circuit 22 is selected such that the stabilizing signal will cause an increase in the output voltage of the inverter or power conversion means 12 in response to a change in motor speed causing an increase in the in-phase signal. Similarly, a change in motor speed causing a decrease in the in-phase signal will result in the generation of a stabilizing signal calling for a decrease in output voltage. As shown by FIG. 2, the circuit 22 has a positive gain; however, it will be obvious to those skilled in the art that the design of the control apparatus 16 and the voltage regulator 32 may be such that a negative gain is appropriate. Such a negative gain can, of course, be provided through the use of suitable inverting devices for reversing the polarity of the stabilizing signal.

Referring now to FIG. 3, the invention also contemplates the alternative delivery of the stabilizing signal over conductor 58 to the frequency generator 30 of the control apparatus 16 for varying the fundamental frequency of the electric power supplied to the motor 10 in response to variations in the stabilizing signal. In this embodiment of the invention, the gain of the circuit 22 is selected such that the stabilizing signal will cause a decrease in the output frequency in response to a change in motor speed causing an increase in the in-phase signal. Similarly, a decrease in the in-phase signal will result in the generation of a stabilizing signal calling for an increase in the output frequency. Again, of course, an appropriate inverting element may be required to assure that the stabilizing signal has the proper polarity.

The gain and the amount of phase shift produced by the stabilizing means 22 is selected for any given motor drive system to provide maximum stability under the operating conditions which could otherwise give rise to instability. For example, it has been found for a 40 horsepower motor of the reluctance-synchronous type, which exhibited a hunting frequency of approximately 5 cycles/sec when operating at no load at 150 rpm, that a gain of 0.01 per unit and a phase shift of +45° at 5 Hertz resulted in stable motor operation when the stabilizing means 22 was connected as illustrated by FIG. 3. For a given drive system in which the a-c motor is unstable under certain operating conditions, the proper values of the resistance and capacitance of the stabilizing circuit can be established either experimentally or through the use of analytic tools such as Nyquist and Bode diagrams.

From the foregoing, it will be seen that improved means have been provided for stabilizing operation of a-c motors utilized in a-c adjustable speed drive systems. Furthermore, it will be seen that the stabilizing means taught herein is relatively simple and does not require major modifications. In fact, the stabilizing means of this invention utilizes as its control input an in-phase signal which is utilized for other control functions in drive systems of the type disclosed by said aforesaid U.S. Pat. application Ser. No. 147,771.

While the invention has been particularly shown and described with reference to preferred embodiments thereof, it will be understood by those skilled in the art that various changes in form, details, and application may be made therein without departing from the spirit and scope of the invention. Furthermore, although the invention has been illustrated in a polyphase drive system, it is equally applicable to single phase systems. Similarly, while the invention has been illustrated in a drive system including a single a-c motor 10, the invention is applicable to drive systems incorporating multiple motors. Accordingly, it is intended that all such modifications and changes be included within the scope of the appended claims.

What is claimed as new and is desired to secure by Letters Patent of the United States is:

1. A control signal generating apparatus for damping motor speed oscillations in an a-c adjustable speed motor drive system wherein said system includes a polyphase a-c motor, power conversion means for changing unidirectional electric power to polyphase power adjustable in frequency and voltage for application as drive current to said a-c motor, and control apparatus including frequency control means and voltage control means responsive to control signals generated by said control signal generating apparatus for respectively controlling the frequency and voltage of the polyphase power produced by said power conversion means, said control signal generating apparatus comprising:

a. detector means, operative during delivery of polyphase power to said a-c motor by said power conversion means, for generating a phase signal proportional to the polyphase current applied to said a-c motor by said power conversion means which is in phase with the output voltage of said power conversion means;

b. first feeback means coupled to said detector means and receiving therefrom said phase signal and further coupled to said voltage control means of said control apparatus for providing to said voltage control means an IR compensation signal proportional to said phase signal as a one of said control signals while said a-c motor is operating at a substantially steady speed; and c. second feedback means coupled to said detector means and receiving therefrom said phase signal, said second feedback means responsive to variations in said phase signal to produce a stabilizing signal, as another one of said control signals, and having variations therein proportional to and shifted in phase with respect to variations in said phase signal while the speed of said a-c motor is oscillating about a specified steady state speed, said second feedback means further being coupled to a selected one of said frequency control means and said voltage control means of said control apparatus for supplying said stabilizing signal thereto.

2. A control signal generating apparatus as defined by claim 1 in which said second feedback means comprises capacitive and resistive elements connected in series whereby said stabilizing signal produced by said second feedback means in response to said phase signal, leads said phase signal.

3. A control signal generating apparatus as defined by claim 1 in which said stabilizing signal, produced by said second feedback means, is coupled to said voltage control means and in which said second feedback means provides a gain such that said stabilizing signal causes an increase in the voltage of the polyphase power produced by said power conversion means in response to an increase in said phase signal.

4. A control signal generating apparatus as defined by claim 1 in which said stabilizing signal, produced by said second feedback means, is coupled to said frequency control means and in which said second feedback means provides a gain such that said stabilizing signal causes a decrease in the frequency of the polyphase power produced by the power conversion means in response to an increase in said phase signal.

5. A control signal generating apparatus as defined by claim 1 further comprising means for attenuating operation of said first feedback means during the occurrence of motor speed oscillations about a steady state motor speed.

6. A control signal generating apparatus as defined by claim 1 in which said stabilizing signal, produced by said second feedback means, is coupled to only the selected one of said frequency control means and said voltage control means.

\* \* \* \* \*